United States Patent
Borkenhagen et al.

(10) Patent No.: US 11,146,307 B1
(45) Date of Patent: Oct. 12, 2021

(54) DETECTING DISTORTION IN SPREAD SPECTRUM SIGNALS

(71) Applicant: INTERNATIONAL BUSINESS MACHINES CORPORATION, Armonk, NY (US)

(72) Inventors: John Borkenhagen, Rochester, MN (US); Christopher Steffen, Rochester, MN (US); Grant P. Kesselring, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/846,991

(22) Filed: Apr. 13, 2020

(51) Int. Cl.
*H04B 1/7097* (2011.01)

(52) U.S. Cl.
CPC ..... *H04B 1/7097* (2013.01); *H04B 2215/064* (2013.01)

(58) Field of Classification Search
CPC ...... H04B 1/0466; H04B 1/7097; H04B 1/00; H04B 7/0656
See application file for complete search history.

(56) References Cited

U.S. PATENT DOCUMENTS

| | | | | |
|---|---|---|---|---|
| 4,216,354 A | * | 8/1980 | Esteban | H04B 1/667 704/205 |
| 4,790,015 A | * | 12/1988 | Callens | G10L 19/24 375/240 |
| 4,933,957 A | * | 6/1990 | Bottau | G10L 19/12 375/244 |
| 5,446,767 A | * | 8/1995 | Nakagawa | H03L 7/085 375/376 |
| 5,448,569 A | * | 9/1995 | Huang | H04W 36/30 370/332 |
| 5,507,035 A | * | 4/1996 | Bantz | H04B 7/0817 455/133 |
| 5,515,366 A | * | 5/1996 | Chieu | H04B 7/2656 370/347 |
| 5,533,025 A | * | 7/1996 | Fleek | H04B 1/7156 370/445 |
| 5,757,870 A | * | 5/1998 | Miya | H04B 1/70752 370/515 |

(Continued)

FOREIGN PATENT DOCUMENTS

WO 0021237 A1 4/2000

OTHER PUBLICATIONS

J. Hancock, Jitter-Understanding it, Measuring it, Eliminating it, High Frequency Electronics, 2004 (Year: 2004).*

(Continued)

*Primary Examiner* — Berhanu Tadese
(74) *Attorney, Agent, or Firm* — Nathan M. Rau

(57) ABSTRACT

The invention relates to a method, a circuit, and an apparatus for detecting distortion in spread spectrum signals. An edge in a spread spectrum clock signal is identified based on a reference clock signal. The edge data is then provided to a set of counters which are incremented corresponding to an identified edge. Each bit of a respective output of the counters are provided to a respective OR gate of a set of OR gates. An OR gate from the set of OR gates corresponding to a selected bit then outputs an indication of whether distortion exists in the spread spectrum clock signal.

20 Claims, 7 Drawing Sheets

(56) References Cited

U.S. PATENT DOCUMENTS

| | | | | |
|---|---|---|---|---|
| 5,774,494 | A * | 6/1998 | Sawahashi | H04B 1/707 375/152 |
| 5,943,329 | A * | 8/1999 | Ohgoshi | H04B 7/2628 370/335 |
| 6,011,546 | A * | 1/2000 | Bertram | H04N 21/443 348/563 |
| 6,115,676 | A * | 9/2000 | Rector | G01D 4/004 702/62 |
| 6,175,860 | B1 * | 1/2001 | Gaucher | H04L 12/2809 709/208 |
| 6,243,413 | B1 * | 6/2001 | Beukema | H04B 3/542 340/12.33 |
| 6,289,213 | B1 * | 9/2001 | Flint | H04M 1/72502 455/420 |
| 6,292,507 | B1 * | 9/2001 | Hardin | H03L 7/0898 327/148 |
| 6,405,261 | B1 * | 6/2002 | Gaucher | H04B 3/54 709/250 |
| 6,526,385 | B1 * | 2/2003 | Kobayashi | G10L 19/018 348/423.1 |
| 6,741,636 | B1 * | 5/2004 | Lender | H04B 1/707 375/146 |
| 6,775,342 | B1 * | 8/2004 | Young | H03L 7/0816 375/371 |
| 6,802,033 | B1 * | 10/2004 | Bertin | H04L 1/0053 370/311 |
| 7,043,206 | B2 * | 5/2006 | Herdey | H03F 3/45977 327/337 |
| 7,050,478 | B1 * | 5/2006 | Weekly | G06F 1/08 327/101 |
| 7,164,368 | B1 * | 1/2007 | Ireland | G01D 7/12 341/34 |
| 7,187,705 | B1 * | 3/2007 | Richmond | H04B 1/69 375/130 |
| 7,339,364 | B2 * | 3/2008 | Kam | G01R 29/26 324/750.3 |
| 7,389,095 | B1 * | 6/2008 | Liu | H04B 15/02 331/16 |
| 7,501,865 | B1 * | 3/2009 | Jacobowitz | H03L 7/093 327/147 |
| 7,742,556 | B1 * | 6/2010 | Qian | H03L 7/0807 376/376 |
| 7,750,713 | B2 * | 7/2010 | Oh | G06F 1/04 327/291 |
| 7,944,229 | B2 * | 5/2011 | Joshi | G01R 31/31726 324/762.01 |
| 8,072,253 | B2 * | 12/2011 | Kaeriyama | H03L 7/07 327/231 |
| 8,090,888 | B2 * | 1/2012 | Milan | H04W 88/14 710/100 |
| 8,284,816 | B1 * | 10/2012 | Clementi | H04B 15/02 375/130 |
| 8,473,233 | B1 * | 6/2013 | Giust | G01R 31/31709 702/69 |
| 9,081,501 | B2 * | 7/2015 | Asaad | G06F 12/0862 |
| 9,209,966 | B1 * | 12/2015 | Hossain | H04L 7/0337 |
| 9,450,641 | B2 * | 9/2016 | Chung | H04B 1/69 |
| 9,639,114 | B2 * | 5/2017 | Shirai | H04N 5/3577 |
| 9,804,231 | B2 * | 10/2017 | Eckert | G01R 31/40 |
| 10,446,937 | B2 * | 10/2019 | Vannucci | H04B 1/3805 |
| 10,466,289 | B2 * | 11/2019 | Lee | G01R 29/26 |
| 2001/0014114 | A1 * | 8/2001 | Baltersee | H04B 1/7085 375/148 |
| 2001/0052871 | A1 * | 12/2001 | Fukae | G01S 13/04 342/70 |
| 2004/0095020 | A1 * | 5/2004 | Kernahan | H02M 3/156 307/35 |
| 2004/0095081 | A1 * | 5/2004 | Kernahan | H05B 41/2827 315/307 |
| 2004/0095108 | A1 * | 5/2004 | Kernahan | H03K 19/215 323/282 |
| 2004/0095112 | A1 * | 5/2004 | Kernahan | H02M 1/0845 323/282 |
| 2004/0095116 | A1 * | 5/2004 | Kernahan | G06F 1/24 323/282 |
| 2004/0095164 | A1 * | 5/2004 | Kernahan | G11C 27/02 327/94 |
| 2004/0095264 | A1 * | 5/2004 | Thomas | H02M 3/1584 341/53 |
| 2004/0128591 | A1 * | 7/2004 | Ihs | G01R 31/31709 714/704 |
| 2005/0013343 | A1 * | 1/2005 | Giunco | H03L 7/095 375/130 |
| 2007/0063755 | A1 * | 3/2007 | Gilliland | H03K 7/06 327/291 |
| 2007/0091986 | A1 * | 4/2007 | Wu | H04B 1/69 375/148 |
| 2008/0198945 | A1 * | 8/2008 | Egan | H04B 1/707 375/296 |
| 2008/0265957 | A1 * | 10/2008 | Luong | H03L 7/089 327/156 |
| 2009/0135885 | A1 * | 5/2009 | Lin | H04B 1/69 375/130 |
| 2010/0027585 | A1 * | 2/2010 | Jeanson | H04B 15/04 375/130 |
| 2010/0061424 | A1 * | 3/2010 | Germann | H04B 1/69 375/130 |
| 2010/0090732 | A1 * | 4/2010 | Lee | H03L 7/093 327/156 |
| 2010/0166039 | A1 * | 7/2010 | Jeon | H03C 3/095 375/130 |
| 2010/0218042 | A1 * | 8/2010 | Milan | H04L 12/44 714/21 |
| 2011/0169582 | A1 * | 7/2011 | Kim | H03L 7/081 331/1 R |
| 2011/0199138 | A1 * | 8/2011 | Sano | H03L 7/0814 327/158 |
| 2011/0219208 | A1 * | 9/2011 | Asaad | G06F 9/06 712/12 |
| 2013/0141076 | A1 | 6/2013 | Zhang | |
| 2013/0182747 | A1 * | 7/2013 | Nakamura | H04B 1/7073 375/145 |
| 2014/0159787 | A1 * | 6/2014 | Hsu | H03L 7/1976 327/156 |
| 2014/0233744 | A1 * | 8/2014 | Risberg | H03G 9/005 381/61 |
| 2014/0269848 | A1 * | 9/2014 | Schrom | H03L 7/18 375/148 |
| 2015/0015426 | A1 * | 1/2015 | Lindahl | H03K 9/08 341/53 |
| 2016/0011996 | A1 * | 1/2016 | Asaad | G06F 12/0862 710/308 |
| 2016/0182075 | A1 * | 6/2016 | Devarajan | H03M 1/128 341/120 |
| 2017/0033707 | A1 * | 2/2017 | Nishijima | H02M 1/36 |
| 2018/0069554 | A1 | 3/2018 | Chen et al. | |
| 2019/0377026 | A1 * | 12/2019 | Steffen | G01R 31/31727 |

OTHER PUBLICATIONS

ITU-T Rec. 0.172 (Apr. 2005) Jitter and wander measuring equipment for digital systems which are based on the synchronous digital hierarchy (SDH) (Year: 2005).*

IBM Appendix P, "List of IBM Patents or Patent Applications to be Treated as Related", Apr. 13, 2020, 2 pages.

Tektronix, "Characterizing and Troubleshooting Jitter with Your Oscilloscope", Entest, Inc. (online), accessed Feb. 20, 2020, 14 pages, URL: http://www.entestinc.com/media/app-notes/55W-61099-0_TS-Jitter_AN_02.pdf.

Li et al., "AC 2011-409: Measuring the Jitter of Clock Signal", American Society for Engineering Education, URL: https://www.asee.org/public/conferences/1/papers/409/download (online), dated 2011, printed May 11, 2018, 12 pages.

(56) References Cited

OTHER PUBLICATIONS

International Search Report and Written Opinion, PCT/IB2021/052736, dated Jul. 8, 2021, 7 pages.

\* cited by examiner

DETECTING DISTORTION IN SPREAD SPECTRUM SIGNALS

BACKGROUND

Field of the Invention

The field of the invention is data processing, or, more specifically, methods, apparatus, and products for detecting distortion in spread spectrum signals.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Systems may use spread spectrum clocking to reduce electromagnetic interference (EMI). Spread spectrum reduces EMI by deliberately spreading a signal in the frequency domain to distribute power across a wider bandwidth. In some cases, the spread spectrum signal may be distorted and cause a non-linear distribution of power. For instance, the spread spectrum signal may be compressed or contain a discontinuity. Existing solutions for identifying distortion in a spread spectrum signal may require prohibitively expensive external lab equipment or other complex testing methodologies.

SUMMARY

A method for detecting distortion in spread spectrum signals may include: identifying, based on a reference clock signal, one or more edges in a spread spectrum clock signal; increment one or more counters corresponding to the one or more edges, the one or more counters included in a plurality of counters; providing each bit of a respective output of the plurality of counters to a respective OR gate of a plurality of OR gates; and outputting, based on an output of an OR gate of the plurality of OR gates corresponding to a selected bit, an indication of whether distortion exists in the spread spectrum clock signal. The method for detecting distortion in spread spectrum signals may be implemented in a circuit. The method for detecting distortion in spread spectrum signals may also be implemented in an apparatus including a circuit configured to perform the method. The method provides the advantage of being able to detect distortion in spread spectrum clock signals on-chip, without the need for additional and potentially expensive lab equipment.

In an optional embodiment, outputting the indication of whether distortion exists in the spread spectrum clock signal comprises: outputting, by a multiplexer coupled to the plurality of OR gates, to another OR gate, the output of the OR gate corresponding to the selected bit; outputting, by the other OR gate, an input to a latch clocked by the reference clock signal, wherein the other OR gate accepts, as input, an output of the latch; and output, as the indication of whether distortion was detected in the spread spectrum clock signal, an output of the latch. This provides the advantage of having a selected OR gate output latched until testing is concluded, after which the latched value can be provided as an indication of whether distortion was detected.

In an optional embodiment, selected bit is based on an average count across the plurality of counters and a type of distortion to detect. This provides the advantage of allowing for multiple types of distortion to be detected using a same hardware configuration, depending on which bit is selected.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
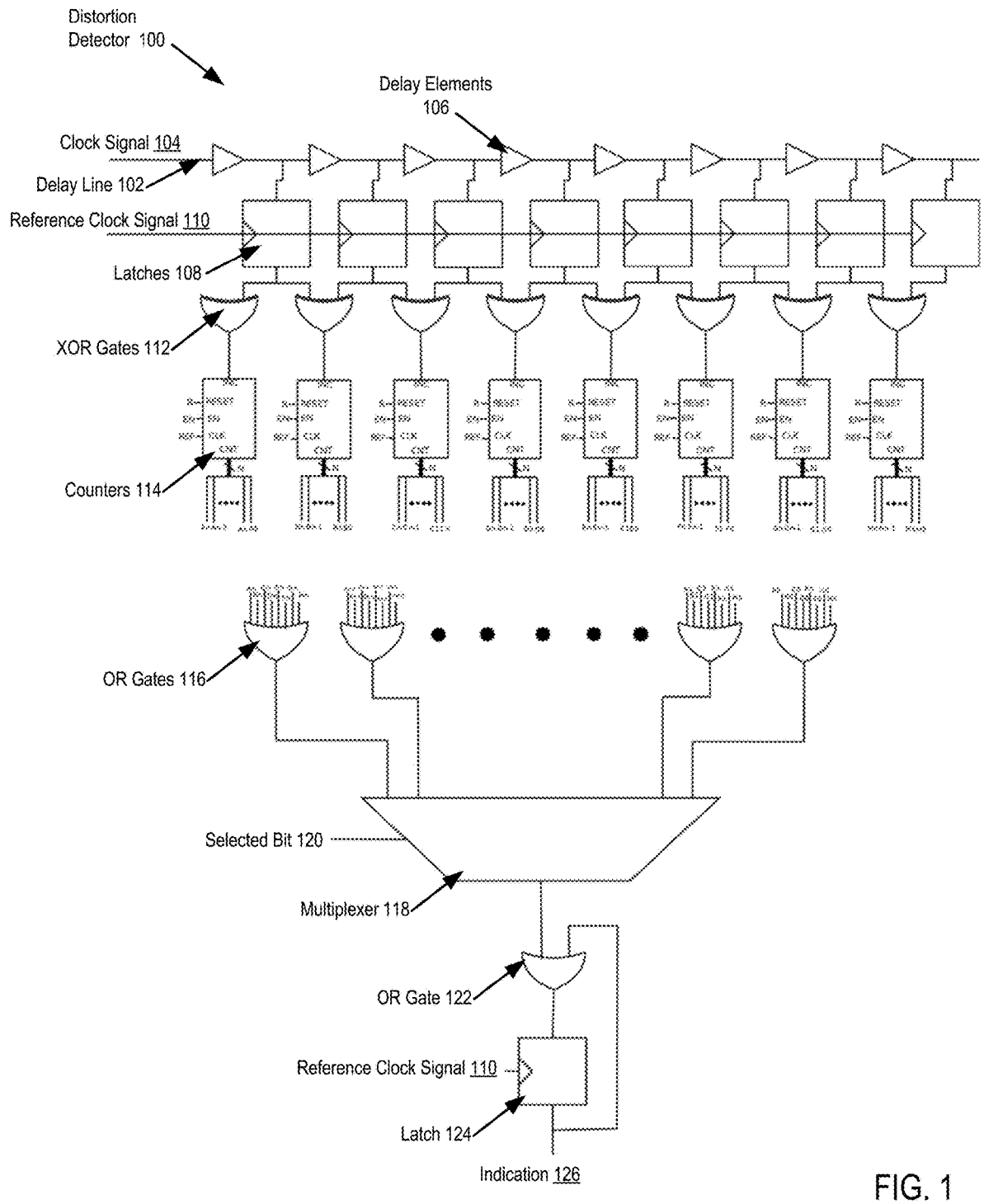
FIG. 1 is a diagram of an example circuit for detecting distortion in spread spectrum signals.

Exemplary methods, circuits, and apparatus for detecting distortion in spread spectrum signals in accordance with the present invention are described with reference to the accompanying drawings, beginning with FIG. 1. FIG. 1 sets forth a diagram of a distortion detector 100 circuit for detecting distortion in spread spectrum signals according to embodiments of the present invention.

The distortion detector 100 includes a delay lines 102 carrying a spread spectrum clock signal 104. The spread spectrum clock signal 104 is a clock signal that is spread in the frequency domain to distribute power across a wider bandwidth. The spread spectrum clock signal 104 may experience distortion that is detectable by the distortion detector 100. The delay lines 102 includes a plurality of delay elements 106. The delay elements 106 can include, for example, buffers, inverters, logic gates, transmission gates, etc. A plurality of latches 108 clocked by a reference clock signal 110 tap the delay lines 102. In this example, the plurality of latches 108 tap the delay line such that the data input for each latch 108 is between two delay elements 106.

Each of the plurality of latches 108 other than the last latch 108 tapping the delay lines 102 provides an output to a respective two exclusive OR (XOR) gates 112 of a plurality of XOR gates 112. In this example, the last latch 206 provides output to only one respective XOR gate 112. The output of the XOR gates 112 indicates where an edge of the spread spectrum clock signal 104 occurs. In other words, an output of "1" by an XOR gate 112 indicates an edge transition (e.g., low-to-high, high-to-low) in the spread spectrum clock signal 104 occurring between the two latches 108 that feed the XOR gate 112.

The output of the XOR gates 112 is provided as input to a plurality counters 114. Accordingly, each time an edge is detected by an XOR gate 112, a corresponding counter 114 is incremented. Each counter 114 provides, as output, an n-bit value indicating a number of edges recorded by the counter 114. The outputs of the counters 114 are provided to a plurality of OR gates 116. The distortion detector 100 includes a number of OR 116 gates equal to the number of bits encoding the outputs of the counters 114. For example, where the counters 114 provide their output as an eight-bit value, the distortion detector 100 includes eight OR gates 116. In other words, where each counter 114 outputs an n-bit value, the distortion detector 100 includes OR gates 116.

Each OR gate 116 receives, as input, a respective same-indexed bit from each of the counter 114 outputs. For example, assuming an n-bit output from each counter 114, a first OR gate 116 receives the nth bit from each counter 114 (e.g., the most significant bit from each counter 114), a second OR gate 116 receives the (n–1)th bit from each counter 114, etc. and a an nth OR gate 116 receives the least significant bit from each counter 114. Thus, each OR gate 116 provides, as output, an indication as to whether any counter 114 stores a value with a "1" at the bit index corresponding to the OR gate 116.

Each OR gate 116 provides its output to a multiplexer 118. The multiplexer 118 provides, as output, the output of the OR 116 gate corresponding to a selected bit 120. Thus, for a selected bit 120 value (n-i), the multiplexer 118 provides, as output, the output of the OR gate 116 corresponding to the (n-i)th bit of the counter 114 outputs. The multiplexer 118 output is provided to an OR gate 122. The OR gate 122 accepts, as input, the output of the multiplexer 118 and the output of a latch 124 receiving the output of the OR gate 122 and clocked by the reference clock signal 110. Thus, the output of the multiplexer 118 (e.g., the indication 126 of whether distortion was found in the spread spectrum clock signal 104) is latched until testing has concluded.

The distortion detector 100 may be used to detect distortion in the spread spectrum clock signal 104 depending on the particular selected bit 120. Assuming the spread frequency and amplitude of the spread spectrum clock signal 104 are known, a number of reference clock signal 110 cycles per period ("refCyclesPerPeriod") is determined by dividing the spread period ("spreadPeriod") by the reference clock signal 110 period ("refClkPeriod"). In other words, refCyclesPerPeriod=spreadPeriod/refClkPeriod.

The total number of reference clock signal 110 cycles ("refCycles") is determined by multiplying a desired number of spread periods ("numSpreadPeriods") by the number of reference clock cycles per period. In other words, refCycles=numSpreadPeriods*refCyclesPerPeriod. The spread width ("spreadWidth") is determined by dividing the spread amplitude ("spreadAmplitude") by the average delay of a single delay element 106 ("delayElement"). In other words, spreadWidth=spreadAmplitude/delayElement. The average count across all counters 114 within the spread ("avgCount") is determined by dividing the total number of reference clock signal 110 cycles by the spread width (e.g., avgCount=refCycles/spreadWidth).

Figure 4:
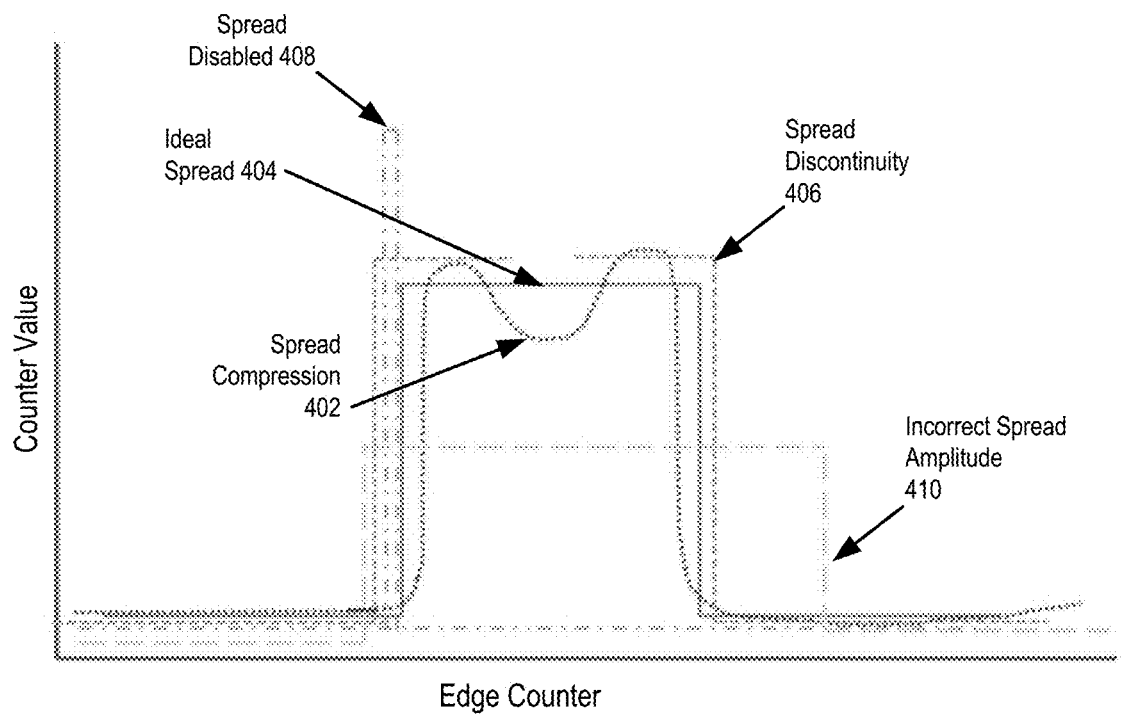
FIG. 4 is a graph of example distributions of spread spectrum signals experiencing different types of distortion.
Figure 5:
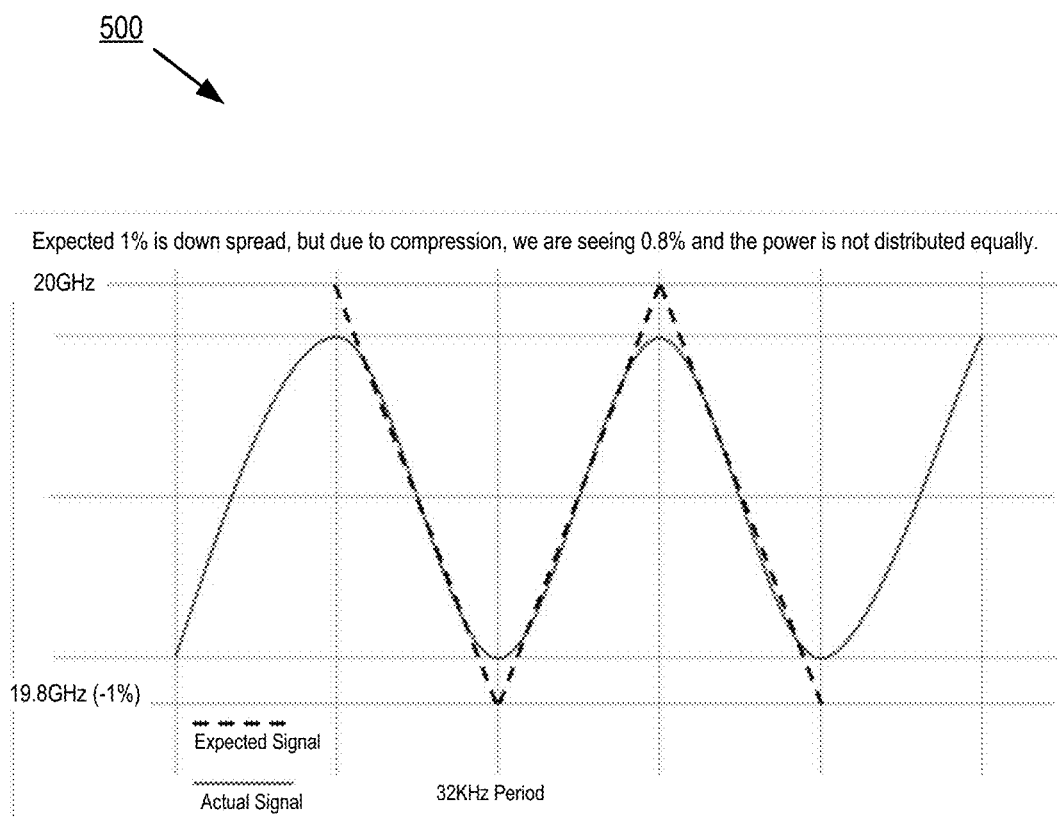
FIG. 5 is a graph of a spread spectrum clock experiencing compression.

The selected bit 120 is determined to be greater than or less than the average count "avgCount" depending on what type of distortion is to be detected. Spread spectrum compression occurs when the spread of the spread spectrum clock signal 104 does not reach the edges of the spread amplitude. For example, line 402 of FIG. 4 shows compression relative to an ideal spread shown by line 404 of FIG. 4. As another example, FIG. 5 shows another graph 500 depicting compression of a spread spectrum signal. This will result in a binomial distribution within the counters 114. The edges of the spread will have larger values due to the sinusoidal frequency trend. To detect compression, the selected bit 120 is set to a value slightly greater than the avgCount value. The specific differential between the avgCount value and the selected bit may be determined through experimentation and tuning for the particular hardware providing the spread spectrum clock signal 104.

Discontinuity distortion is the result of a non-linear spread. This will result in a 'gap' within the counters 114 where one or more counters 114 will contain a much lower value than the average "avgCount." For example, line 406 of FIG. 4 shows discontinuity relative to an ideal spread shown by line 404 of FIG. 4. To detect discontinuity, the selected bit 120 is set to a value much greater than the avgCount value. The specific differential between the avgCount value and the selected bit may be determined through experimentation and tuning for the particular hardware providing the spread spectrum clock signal 104.

If spread spectrum is disabled in the spread spectrum clock signal 104 (e.g., spread spectrum was expected but not present), the spreadWidth value will be reduced and the counters 114 will store relatively large values. For example, line 408 of FIG. 4 shows a disabled spread spectrum relative to an ideal spread shown by line 404 of FIG. 4. To detect a disabled spread spectrum, the selected bit 120 is set to a value much greater than the avgCount value. The specific differential between the avgCount value and the selected bit may be determined through experimentation and tuning for the particular hardware providing the spread spectrum clock signal 104.

If the spread amplitude in the spread spectrum clock signal 104 is greater than an expected or desired value, the spreadWidth value will be increased and the counters 114 will store relatively small values. For example, line 410 of FIG. 4 shows an incorrect spread amplitude relative to an ideal spread shown by line 404 of FIG. 4. To detect an incorrect spread amplitude, the selected bit 120 is set to a value slightly less than the avgCount value. The specific differential between the avgCount value and the selected bit may be determined through experimentation and tuning for the particular hardware providing the spread spectrum clock signal 104.

Figure 2:
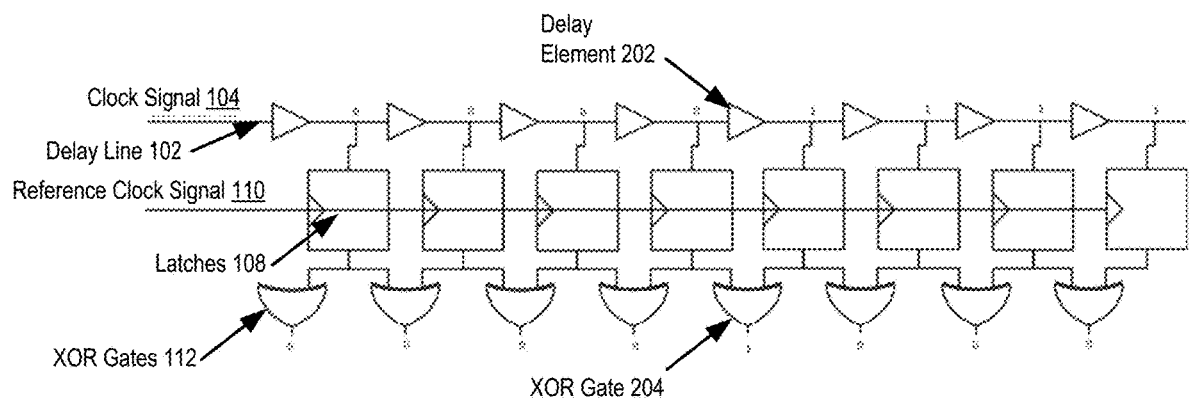
FIG. 2 is a diagram of an example circuit for identifying edges in a spread spectrum signal.

FIG. 2 shows how the delay lines 102, latches 108 clocked by the reference clock signal 110, and XOR gates 112 function to indicate a transition in the spread spectrum clock signal 104. In this example, the spread spectrum clock signal 104 has a "low" state prior to the delay element 202), indicated by a "0." The spread spectrum clock signal 104 has a "high" state after to the delay element 202), indicated by a "1." The output of the respective latches 108 are provided as input to the XOR gates 112 such that the output of the XOR gate 204) is a "1," indicating the edge transition from "low" to "high."

Figure 3:
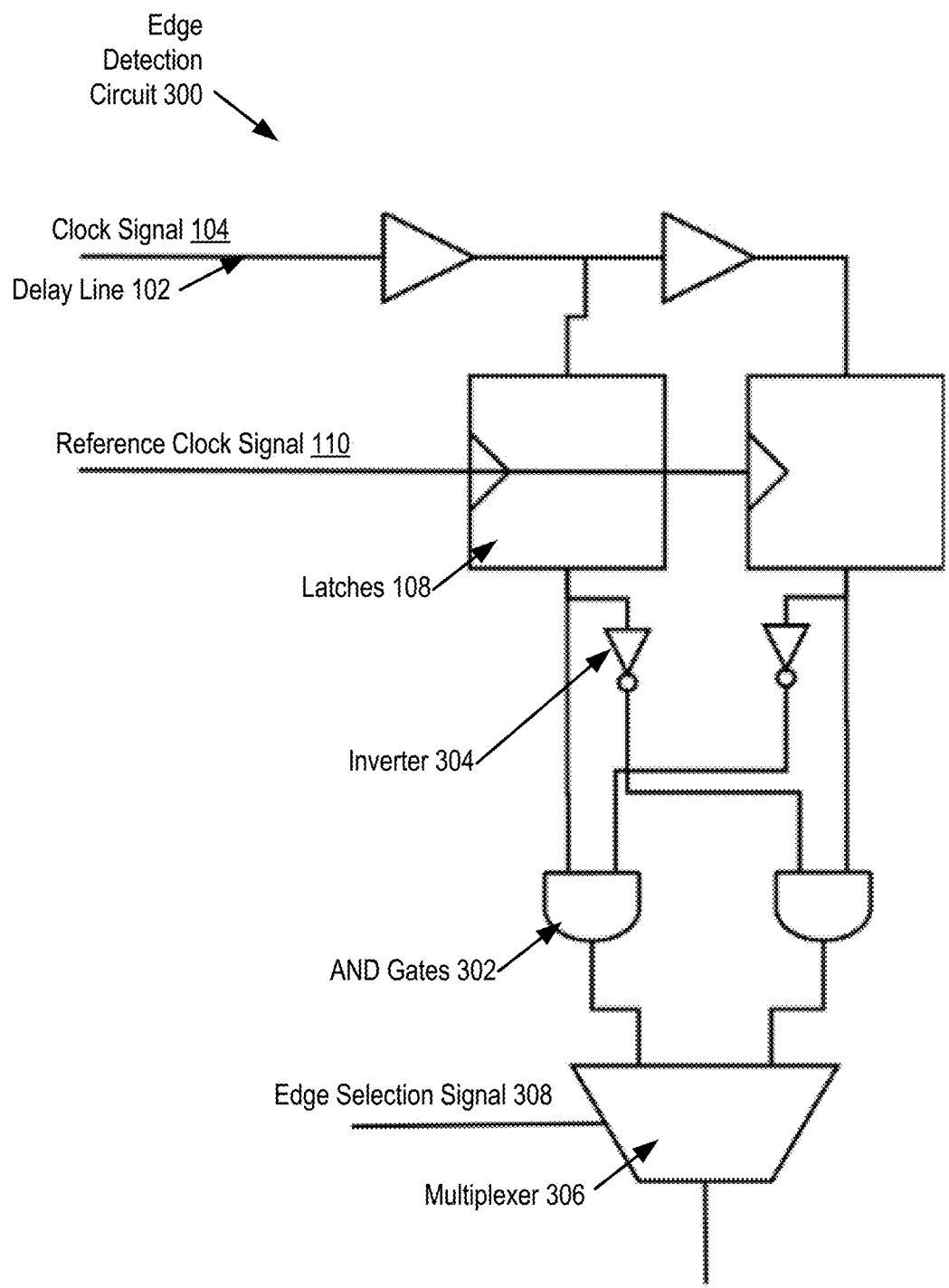
FIG. 3 is a diagram of an example circuit for identifying a particular type of edge in a spread spectrum signal.

FIG. 3 shows an edge detection circuit 100 for detecting a particular type of signal edge (e.g., rising or falling). The edge detection circuit 300 may be included in a distortion detector 100 of FIG. 1. The outputs of the latches 108, instead of being provided directly to XOR gates 112 as in FIG. 1, are provided to AND gates 302. Here, the output of a given latch 108 is provided both to an AND gate 302 corresponding to the given latch 108 and an AND gate 302 corresponding to an adjacent latch 108 via an inverter 304. Here, a first AND gate 302 would indicate whether a rising edge was found and a second AND gate 302 would indicate whether a falling edge was found. The outputs of the AND gates 302 are provided to a multiplexer 306. An edge selection signal 308 determines the output of the multiplexer 306. The edge selection signal 308 indicates which AND gate 302 input (e.g., rising edge or falling edge) will be provided as output of the multiplexer 306.

Figure 6:
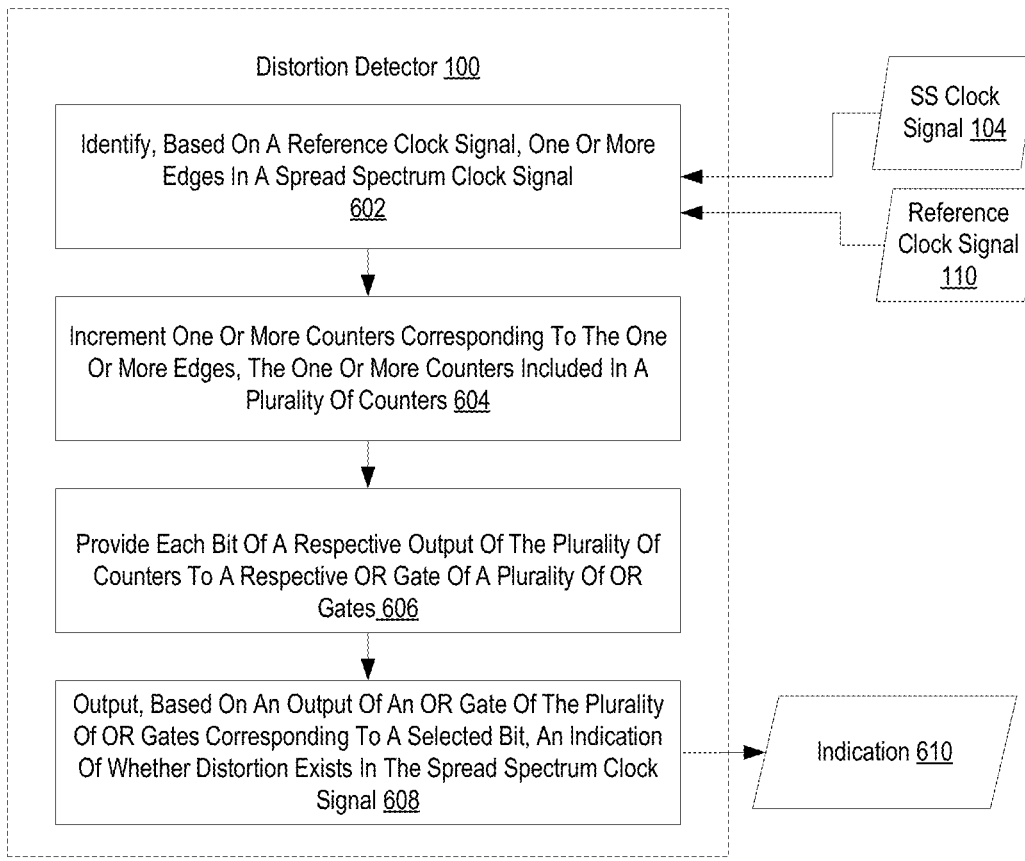
FIG. 6 is a flowchart of an example method for detecting distortion in spread spectrum signals.

For further explanation, FIG. 6 sets forth a flow chart illustrating an exemplary method for detecting distortion in spread spectrum signals according to embodiments of the present invention that includes identifying 602 (e.g., by a distortion detector 100), based on a reference clock signal 110, one or more edges in a spread spectrum clock signal 104. For example, the distortion detector 100 includes delay lines 102 carrying the spread spectrum clock signal 104. A plurality of latches 108 clocked by the reference clock signal 110 tap the delay lines 102. Each of the plurality of latches 108 other than a last latch 108 tapping the delay lines 102 provide an output to a respective two exclusive OR (XOR) gates 112 of a plurality of XOR gates 112. The output of the XOR gates 112 indicates where an edge of the spread spectrum clock signal 104 occurs. In other words, an output of "1" by an XOR gate 112 indicates an edge transition (e.g., low-to-high, high-to-low) in the spread spectrum clock signal 104 occurring between the two latches 108 that feed the XOR gate 112. Accordingly, the one or more edges in the spread spectrum clock signal 104 are identified using the plurality of latches 108 tapping the delay lines 102 and the plurality of XOR gates 112.

The method of FIG. 6 also includes incrementing 604 one or more counters 114 corresponding to the one or more edges, the one or more counters included in a plurality of counters 114. For example, each XOR gate 112 provides it output to a corresponding counter 114. Thus, when an edge is found at a respective XOR gate 112, the counter 114 corresponding to the XOR gate 112 is incremented to reflect the found edge.

The method of FIG. 6 also includes providing 606 each bit of a respective output of the plurality of counters 114 to a respective OR gate 116 of a plurality of OR gates. For example, each counter 114 provides, as output, an n-bit value indicating a number of edges recorded by the counter 114. The outputs of the counters 114 are provided to a plurality of OR gates 116. The distortion detector 100 includes a number of OR 116 gates equal to the number of bits encoding the outputs of the counters 114. For example, where the counters 114 provide their output as an eight-bit value, the distortion detector 100 includes eight OR gates 116. In other words, where each counter 114 outputs an n-bit value, the distortion detector 100 includes OR gates 116.

Each OR gate 116 receives, as input, a respective same-indexed bit from each of the counter 114 outputs. For example, assuming an n-bit output from each counter 114, a first OR gate 116 receives the nth bit from each counter 114 (e.g., the most significant bit from each counter 114), a second OR gate 116 receives the (n−1)th bit from each counter 114, etc. and a an nth OR gate 116 receives the least significant bit from each counter 114. Thus, each OR gate 116 provides, as output, an indication as to whether any counter 114 stores a value with a "1" at the bit index corresponding to the OR gate 116.

The method of FIG. 6 also includes outputting 608, based on an output of an OR gate 116 of the plurality of OR gates 116 corresponding to a selected bit 120, an indication 610 of whether distortion exists in the spread spectrum clock signal 104. The selected bit 120 is based on a particular type of distortion to be detected. Accordingly, an output of a particular OR gate 116 corresponding to the selected bit 120 provides the indication 610 as to whether distortion exists in the spread spectrum clock signal 104.

The method of FIG. 6 provides the advantage of being able to identify distortion in a spread spectrum clock signal 104 on-chip. This alleviates the need for testing using external devices, including potentially expensive lab equipment.

Figure 7:
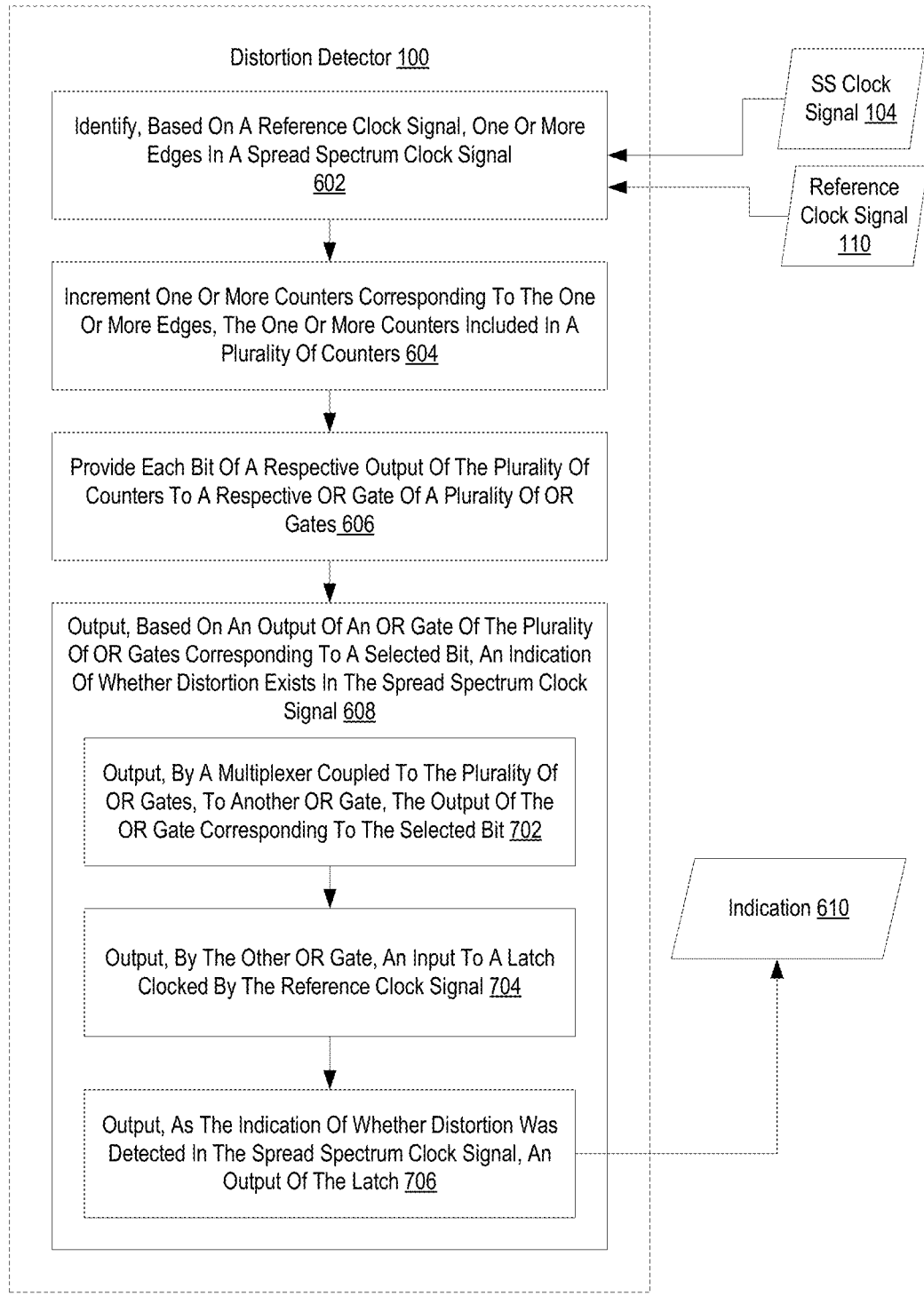
FIG. 7 is a flowchart of an example method for detecting distortion in spread spectrum signals.

For further explanation, FIG. 7 sets forth a flow chart illustrating an exemplary method for detecting distortion in spread spectrum signals according to embodiments of the present invention that includes identifying 602 (e.g., by a distortion detector 100), based on a reference clock signal 110, one or more edges in a spread spectrum clock signal 104; incrementing 604 one or more counters 114 corresponding to the one or more edges, the one or more counters included in a plurality of counters 114; providing 606 each bit of a respective output of the plurality of counters 114 to a respective OR gate 116 of a plurality of OR gates; and outputting 608, based on an output of an OR gate 116 of the plurality of OR gates 116 corresponding to a selected bit 120, an indication 610 of whether distortion exists in the spread spectrum clock signal 104.

The method of FIG. 7 differs from FIG. 6 in that outputting 608, based on an output of an OR gate 116 of the plurality of OR gates 116 corresponding to a selected bit 120, an indication 610 of whether distortion exists in the spread spectrum clock signal 104 includes outputting 702, by a multiplexer 118 coupled to the plurality of OR gates 116, to another OR gate 122, the output of the OR gate 116 corresponding to the selected bit 120. Each OR gate 116 provides its output to the multiplexer 118. The multiplexer 118 provides, as output, the output of the OR 116 gate corresponding to the selected bit 120. Thus, for a selected bit 120 value (n-i), the multiplexer 118 provides, as output, the output of the OR gate 116 corresponding to the (n-i)th bit of the counter 114 outputs. The multiplexer 118 output is provided to the other OR gate 122.

The method of FIG. 7 also includes outputting 704, by the other OR gate 122, an input to a latch 124 clocked by the reference clock signal 110. The output of the latch 124 is tapped and provided as input to the other OR gate 122. Thus, the OR gate 122 accepts, as input, the output of the multiplexer 118 and the output of the latch 124, allowing the output of the multiplexer 118 to be latched until testing has concluded. The method of FIG. 7 also includes outputting 706, as the indication 610 of whether distortion was detected in the spread spectrum clock signal 104, an output of the latch 124.

The method of FIG. 7 allows for a value indicating distortion provided by an OR gate 116 to be latched until testing has concluded (e.g., a number of cycles of the spread spectrum clock signal 104 has run).

In view of the explanations set forth above, readers will recognize that the benefits of detecting distortion in spread spectrum signals according to embodiments of the present invention include:
- Improved performance in identifying distortions in spread spectrum clock signals using an on-chip circuit, eliminating the need for potentially expensive testing equipment external to the chip or complex testing methodologies.
- Improved performance in identifying distortions in spread spectrum clock signals by allowing for a same hardware configuration (e.g., a same circuit) to test for a variety of distortion types.

Improved performance in identifying distortions in spread spectrum clock signals using a circuit tapping a clock signal under test.

Exemplary embodiments of the present invention are described largely in the context of a fully functional computer system for detecting distortion in spread spectrum signals. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of detecting distortion in spread spectrum signals, the method comprising:
   identifying, based on a reference clock signal, one or more edges in a spread spectrum clock signal;
   incrementing one or more counters corresponding to the one or more edges, the one or more counters included in a plurality of counters;
   providing each bit of a respective output of the plurality of counters to a respective OR gate of a plurality of OR gates; and
   outputting, based on an output of an OR gate of the plurality of OR gates corresponding to a selected bit, an indication of whether distortion exists in the spread spectrum clock signal.

2. The method of claim 1, wherein outputting the indication of whether distortion exists in the spread spectrum clock signal comprises:
   outputting, by a multiplexer, to another OR gate, the output of the OR gate of the plurality of OR gates corresponding to the selected bit, wherein the multiplexer is coupled to the plurality of OR gates;
   outputting, by the other OR gate, an input to a latch clocked by the reference clock signal, wherein the other OR gate accepts, as input, an output of the latch; and
   output, as the indication of whether distortion was detected in the spread spectrum clock signal, an output of the latch.

3. The method of claim 1, wherein the selected bit is based on an average count across the plurality of counters and a type of distortion to detect.

4. The method of claim 3, wherein the average count across the plurality of counters comprises a number of reference clock cycles divided by a spread width.

5. The method of claim 4, wherein the spread width comprises a spread amplitude divided by an average delay of a single delay element.

6. The method of claim 3, wherein the selected bit is greater than the average count across the plurality of counters based on the type of distortion comprising a compression, a discontinuity, or a disabled spread spectrum.

7. The method of claim 3, wherein the selected bit is less than the average count across the plurality of counters based on the type of distortion comprising an incorrect spread amplitude.

8. A circuit for detecting distortion in spread spectrum signals, the circuit configured to perform steps comprising:
   identifying, by a XOR gate, based on a reference clock signal, one or more edges in a spread spectrum clock signal;
   incrementing one or more counters corresponding to the one or more edges, the one or more counters included in a plurality of counters;
   providing, by the plurality of counters, each bit of a respective output of the plurality of counters to a respective OR gate of a plurality of OR gates; and
   outputting, by an OR gate of the plurality of OR gates corresponding to a selected bit, an indication of whether distortion exists in the spread spectrum clock signal.

9. The circuit of claim 8, wherein outputting the indication of whether distortion exists in the spread spectrum clock signal comprises:
   outputting, by a multiplexer, to another OR gate, the output of the OR gate of the plurality of OR gates corresponding to the selected bit, wherein the multiplexer is coupled to the plurality of OR gates;
   outputting, by the other OR gate, an input to a latch clocked by the reference clock signal, wherein the other OR gate accepts, as input, an output of the latch; and
   output, as the indication of whether distortion was detected in the spread spectrum clock signal, an output of the latch.

10. The circuit of claim 8, wherein the selected bit is based on an average count across the plurality of counters and a type of distortion to detect.

11. The circuit of claim 10, wherein the average count across the plurality of counters comprises a number of reference clock cycles divided by a spread width.

12. The circuit of claim 11, wherein the spread width comprises a spread amplitude divided by an average delay of a single delay element.

13. The circuit of claim 10, wherein the selected bit is greater than the average count across the plurality of counters based on the type of distortion comprising a compression, a discontinuity, or a disabled spread spectrum.

14. The circuit of claim 10, wherein the selected bit is less than the average count across the plurality of counters based on the type of distortion comprising an incorrect spread amplitude.

15. An apparatus for detecting distortion in spread spectrum signals, comprising:
   a circuit configured to perform steps comprising:
      identifying, by a XOR gate, based on a reference clock signal, one or more edges in a spread spectrum clock signal;
      incrementing one or more counters corresponding to the one or more edges, the one or more counters included in a plurality of counters;
      providing, by the plurality of counters, each bit of a respective output of the plurality of counters to a respective OR gate of a plurality of OR gates; and
      outputting, by an output of an OR gate of the plurality of OR gates corresponding to a selected bit, an indication of whether distortion exists in the spread spectrum clock signal.

16. The apparatus of claim 15, wherein outputting the indication of whether distortion exists in the spread spectrum clock signal comprises:
- outputting, by a multiplexer, to another OR gate, the output of the OR gate of the plurality of OR gates corresponding to the selected bit, wherein the multiplexer is coupled to the plurality of OR gates;
- outputting, by the other OR gate, an input to a latch clocked by the reference clock signal, wherein the other OR gate accepts, as input, an output of the latch; and
- output, as the indication of whether distortion was detected in the spread spectrum clock signal, an output of the latch.

17. The apparatus of claim 15, wherein the selected bit is based on an average count across the plurality of counters and a type of distortion to detect.

18. The apparatus of claim 17, wherein the average count across the plurality of counters comprises a number of reference clock cycles divided by a spread width.

19. The apparatus of claim 17, wherein the selected bit is greater than the average count across the plurality of counters based on the type of distortion comprising a compression, a discontinuity, or a disabled spread spectrum.

20. The apparatus of claim 17, wherein the selected bit is less than the average count across the plurality of counters based on the type of distortion comprising an incorrect spread amplitude.

* * * * *